(12) United States Patent
Kanbe et al.

(10) Patent No.: US 6,742,229 B2
(45) Date of Patent: Jun. 1, 2004

(54) BUCKLE DEVICE

(75) Inventors: Masakata Kanbe, Niwa-gun (JP);
Masahiro Taniguchi, Niwa-gun (JP);
Katsuya Kogiso, Niwa-gun (JP);
Masaya Tajima, Niwa-gun (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 0 days.

(21) Appl. No.: 09/783,398

(22) Filed: Feb. 15, 2001

(65) Prior Publication Data

US 2001/0025403 A1 Oct. 4, 2001

(30) Foreign Application Priority Data

Feb. 18, 2000 (JP) ........................................ 2000-041947

(51) Int. Cl.[7] ............................................... A44B 11/26
(52) U.S. Cl. .............................. 24/633; 24/636; 24/642; 280/801.1
(58) Field of Search .................... 24/303, 633, 642, 24/636, 640, 629; 280/801.1, 802, 803, 804

(56) References Cited

U.S. PATENT DOCUMENTS

| | | | | |
|---|---|---|---|---|
| 3,766,612 A | * | 10/1973 | Hattori | 180/268 |
| 4,027,362 A | * | 6/1977 | Hart et al. | 24/656 |
| 5,218,744 A | * | 6/1993 | Saito | 24/303 |
| 5,648,885 A | * | 7/1997 | Nishioka et al. | 324/252 |
| 5,742,986 A | | 4/1998 | Corrion et al. | |
| 5,839,174 A | * | 11/1998 | Chamings et al. | 24/633 |
| 5,960,523 A | | 10/1999 | Husby et al. | |
| 5,966,784 A | * | 10/1999 | Arbogast et al. | 24/633 |
| 6,076,239 A | * | 6/2000 | Kopetzky et al. | 24/602 |
| 6,079,744 A | * | 6/2000 | Husby et al. | 180/268 |
| 6,198,276 B1 | * | 3/2001 | Konno | 324/207.21 |
| 6,282,942 B1 | * | 9/2001 | Husby | 73/12.04 |
| 6,304,162 B1 | * | 10/2001 | Nakatsuka et al. | 335/302 |

FOREIGN PATENT DOCUMENTS

JP  10-230815  9/1998

OTHER PUBLICATIONS

*Magnetoresistive Sensoren im Kfz Anwendugen: Postions—, Winkel–un Strommessung*,Elektronik, Oct. 17, 1985, pp. 99–102.

*European Search Report*, Jul. 26, 2002.

* cited by examiner

*Primary Examiner*—Anthony Knight
*Assistant Examiner*—André L. Jackson (57) ABSTRACT

A buckle device in which it can be detected whether or not a tongue plate inserted into a case is locked, and in which reliability of such detection is high. In the buckle device, a magnetic plate is provided at a leg portion which moves together with the tongue plate which is inserted into an interior of the case. Changes in orientation of a magnetic field of a magnet of a sensing section, which orientation varies due to the magnetic plate approaching and moving away from the magnet, are detected at an MRE sensor.

18 Claims, 9 Drawing Sheets

BUCKLE DEVICE

BACKGROUND OF THE INVENTION

1. Field of the Invention

The present invention relates to a buckle device, which, in a seat belt device for a vehicle, maintains a state in which a webbing belt restrains the body of a vehicle occupant.

2. Description of the Related Art

A buckle device forms a portion of a seat belt device for restraining, by an elongated webbing belt, the body of a vehicle occupant who is seated in a seat of a vehicle. The buckle device is locked by passing a latch through a hole formed in a tongue plate provided at the webbing belt in a state in which the tongue plate is inserted into a case of the buckle device, so as to apply the webbing belt to the vehicle occupant.

Among such buckle devices, there are those of the type which are provided with a detecting means for detecting whether the latch is engaged with the tongue plate. The detecting means detects unlocked states, such as the tongue plate not being completely inserted into the case or the latch not being engaged even if the tongue plate is completely inserted. Notice can be given of the locked state by, for example, having an indicator be lit only at times when the buckle device is in a locked state.

One example of such a detecting means is a structure using a so-called Hall sensor. (For an example of a structure using a Hall sensor, refer to Japanese Patent Application Laid-Open (JP-A) No. 10-230815, whose counterpart U.S. patent is U.S. Pat. No. 5,742,986.) The Hall sensor is an electronic part whose electrical resistance value varies in accordance with the intensity of a magnetic field by application of the so-called Hall effect.

In such a detecting means utilizing a Hall sensor, for example, the Hall sensor is disposed so as to oppose the latch along the moving direction of the latch within the buckle body, and a magnet (a permanent magnet) is disposed at the side of the Hall sensor which is opposite the side at which the latch is provided. The latch is formed of a magnetic body of iron or the like. The Hall sensor detects changes in the intensity of the magnetic field of the magnet with respect to the Hall sensor, which changes are caused by the latch approaching or moving away from the Hall sensor and the magnet when the latch is engaged with the tongue plate and locked or when this locking is released. Due to the Hall sensor detecting such changes, it can be detected whether or not the latch is engaged with the tongue plate and locked.

However, buckle devices, in which whether or not the tongue plate is locked is detected by using a Hall sensor, have the following problems.

First, as described above, the Hall sensor is of a structure in which the intensity of a magnetic field is fed out as an electric signal by using the Hall effect. Accordingly, when the magnetic force of the magnet, which is the source of the magnetic field, deteriorates due to the passage of time or the like, there is the possibility that, regardless of whether the latch has approached the Hall sensor, the Hall sensor can only detect a magnetic field of an intensity which is the same as that if the latch had not approached the Hall sensor. Thus, a structure utilizing a Hall sensor lacks reliability for use in a buckle device which is used over a relatively long period of time.

Second, Hall sensors generally have poor temperature characteristics. They thus lack reliability for use in buckle devices which are provided in vehicles in which temperature variations are great.

SUMMARY OF THE INVENTION

In view of the aforementioned, an object of the present invention is to provide a buckle device in which it can be detected whether or not a tongue plate inserted into a case is locked, and in which the reliability of such detection is high.

In order to solve the above-described problems, a buckle device of the present invention comprises: a tongue plate; a buckle main body; a movable latch interlocking with the tongue plate which is inserted into the buckle main body; at least one movable magnetic body related to interlock operation; and a sensor operable for detecting movement of the magnetic body, wherein the sensor includes a magnetoresistance element utilizing an anisotropic magnetoresistance effect, and a bias magnet.

A belt buckle device of the present invention comprises: a belt having a tongue plate at one end of the belt; a buckle main body; a latch which releasably interlocks with the tongue plate within the buckle main body; and a sensor for detecting interlock operation, the sensor including a magnetoresistance element utilizing an anisotropic magnetoresistance effect, and a bias magnet.

A seat belt device for a vehicle of the present invention comprises: a flexible belt, one end of the flexible belt being mounted one of directly and indirectly to one of a vehicle body and a seat, the other end of the flexible belt having a tongue plate; a buckle main body, one end of the buckle main body being mounted one of directly and indirectly to one of the vehicle body and the seat, the other end of the buckle main body having an opening; a movable latch for interlocking with a tongue plate which is inserted into the opening of the buckle main body; and a sensor operable for detecting interlocking operation, the sensor including a magnetoresistance element utilizing an anisotropic magnetoresistance effect, and a bias magnet.

DESCRIPTION OF THE PREFERRED EMBODIMENTS

First Embodiment

Figure 1:
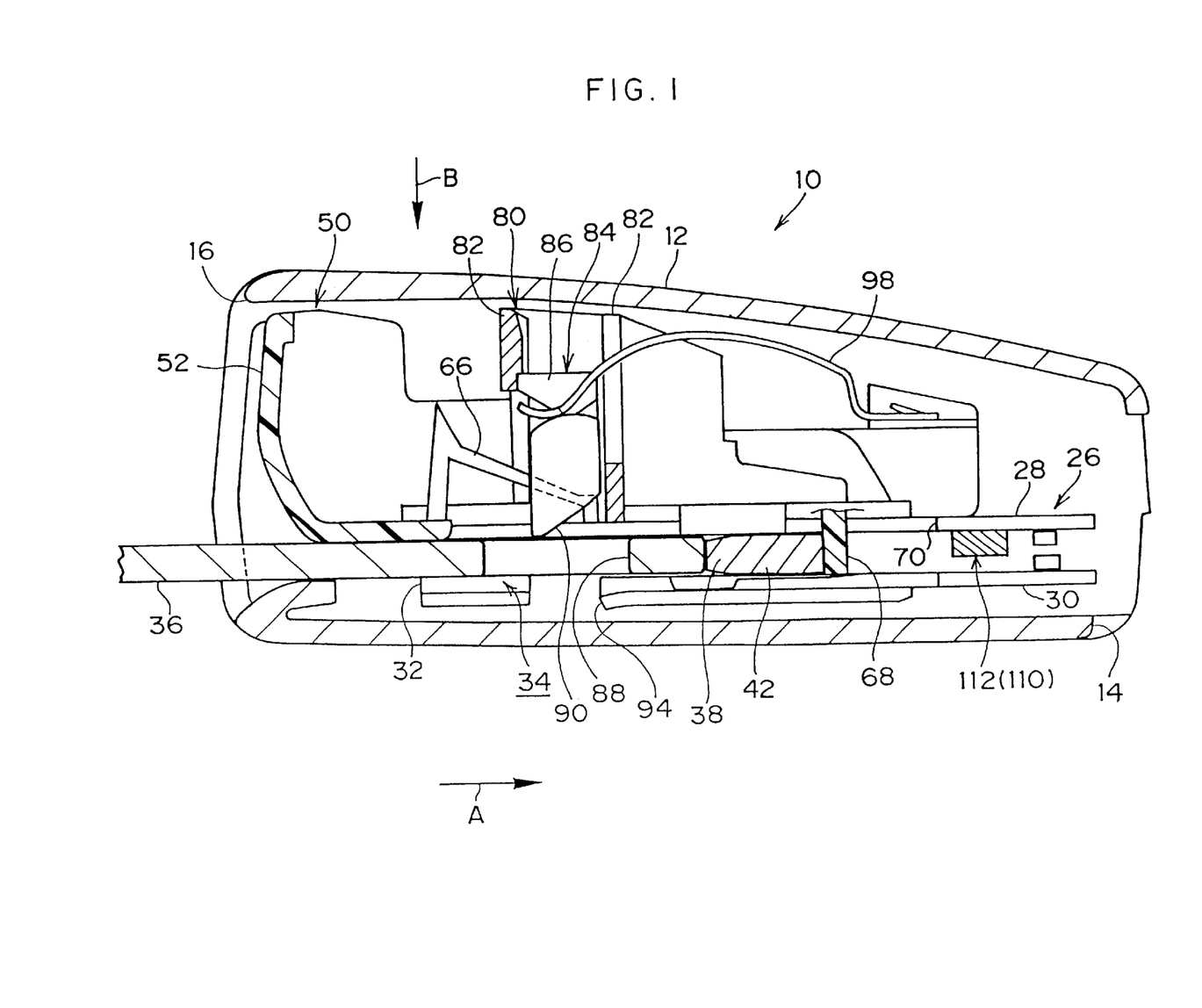
FIG. 1 is a cross-sectional view illustrating the structure of a buckle device relating to a first embodiment of the present invention.
Figure 2:
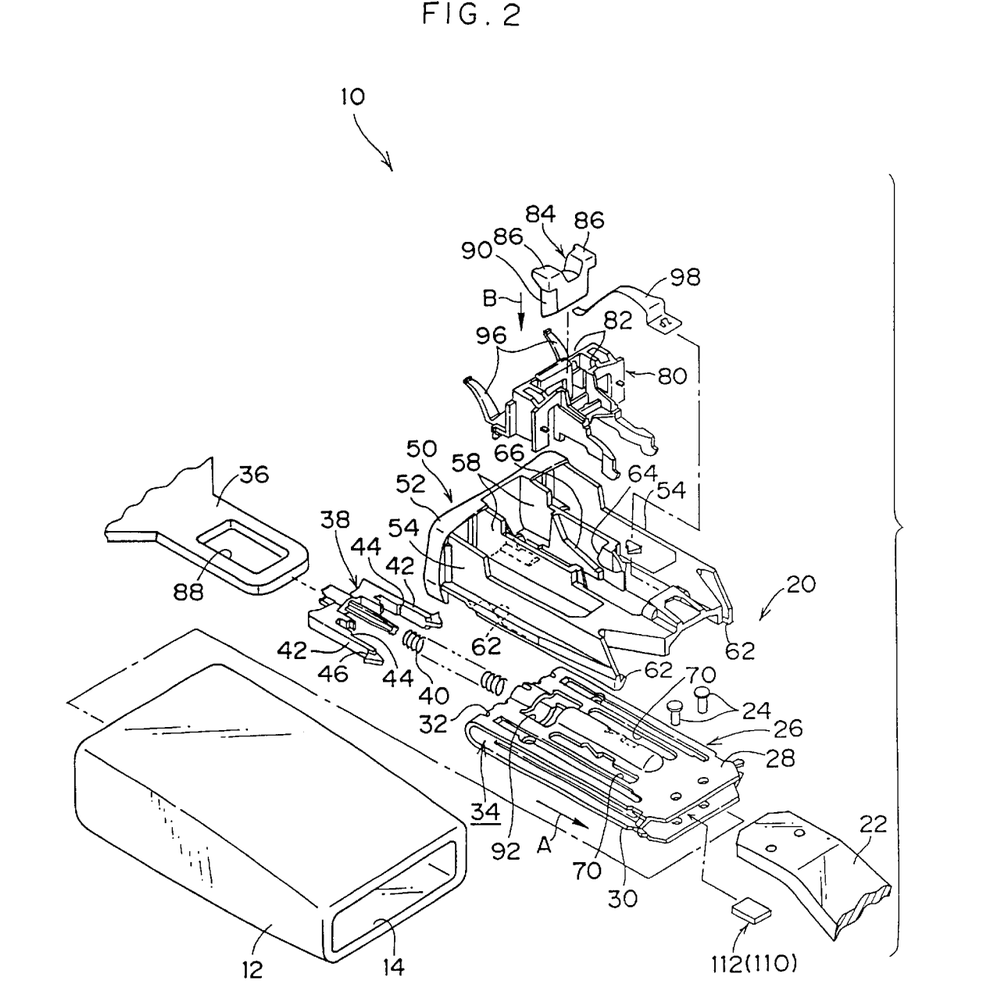
FIG. 2 is an exploded perspective view illustrating the structure of the buckle device relating to the first embodiment of the present invention.

FIG. 2 is an exploded perspective view of a buckle device 10 relating to a first embodiment of the present invention. FIG. 1 is a cross-sectional view of the buckle device 10 in an appropriate position. As illustrated in these drawings, the buckle device 10 is provided with a substantially box-shaped case 12. The case 12 is formed from a synthetic resin material. An elongated slit hole 14 is formed along the transverse direction of the case 12 at one longitudinal direction end portion of the case 12. An opening 16 is formed in the other longitudinal direction end portion of the case 12.

A buckle main body 20 is accommodated in the case 12. The buckle main body 20 is provided with an anchor plate 26 serving as a guide and mounted by rivets 24 to a mounting portion 22 which extends from a vehicle body (not shown). The anchor plate 26 is formed as an elongated plate which has been folded over at the longitudinal direction central portion thereof, such that an upper plate 28 and a lower plate 30, which are disposed parallel to each other with a predetermined interval therebetween, are formed at the anchor plate 26. An insertion hole 32 is formed in the center of one end (the folded-over portion) of the anchor plate 26. A tongue plate 36 is inserted, from this insertion hole 32, into an insertion portion 34 which is formed between the upper plate 28 and the lower plate 30. A through hole (not shown) is formed in the tongue plate 36. The webbing of a seat belt device is inserted through this through hole. Further, the mounting portion 22 is inserted and fixed from the other end side of the anchor plate 26.

An ejector 38 is accommodated within the anchor plate 26 so as to be slidable along the longitudinal direction of the anchor plate 26 (i.e., in the direction of arrow A in FIGS. 1 and 2 and the direction opposite thereto). An ejector spring 40 is disposed between the ejector 38 and the mounting portion 22, and urges the ejector 38 toward the insertion hole 32 (i.e., in the direction opposite to the direction of arrow A in FIGS. 1 and 2).

A pair of corner portions 42, which are directed toward the mounting plate 22, project out from both transverse direction ends of the ejector 38. Projections 44 formed substantially at the longitudinal direction centers of the corner portions 42 are formed at predetermined positions such that, when the ejector 38 is pushed by the tongue plate 36 and moves toward the mounting portion 22, the projections 44 press against projections (not shown) which are formed to project from a button 50. Further, sliding of the ejector 38 is limited to a fixed range by abutting portions 46, which are formed in vicinities of the distal ends of the corner portions 42, abutting projections (not shown) which project from the anchor plate 26 into the insertion portion 34.

The button 50 is mounted to the upper plate 28 of the anchor plate 26. The button 50 is formed in a substantially rectangular frame shape as viewed from above. The button 50 has an operation portion 52 for push operation, a pair of parallel outer plates 54 which project from vicinities of transverse direction end portions of the operation portion 52, and a pair of parallel inner plates 58 which project from a region of the button 50 further toward the transverse direction inner side thereof than the outer plates 54.

A claw 62 is formed at the projecting end of each outer plate 54 and is directed inwardly. The claw 62 engages from the outer side of the anchor plate 26 with the region between the upper plate 28 and the lower plate 30 of the anchor plate 26, such that the button 50 cannot be separated from the anchor plate 26. Further, the claw 62 is slidable along the longitudinal direction of the anchor plate 26 (in the direction of arrow A in FIGS. 1 and 2 and the direction opposite thereto).

A projection 64 is formed at the inner side of the inner plate 58. An inclined surface 66 is formed further toward the operation portion 52 side than the projection 64 is. The inclined surface 66 slants in the direction of gradually moving away from the anchor plate 26, along the direction toward the operation portion 52. In a state in which the tongue plate 36 is not inserted into the insertion portion 34, the protrusions 64 abut a latch 84, which serves as a lock member and which will be described later, so as to prevent movement of the latch 84 in an engaging direction (the direction of arrow B in FIGS. 1 and 2). Further, in the state in which the tongue plate 36 is inserted into the insertion portion 34 and the latch 84 is engaged with an engagement hole 88 of the tongue plate 36 (i.e., in the locked state), the protrusions 64 abut upper surfaces of abutment portions 86 of the latch 84, such that movement of the latch 84 in the engagement releasing direction (the direction opposite to the direction of arrow B in FIGS. 1 and 2) is prevented.

In the locked state, when the button 50 is moved in the lock releasing direction (the direction of arrow A in FIGS. 1 and 2), the inclined surfaces 66 convert this pressing force into force for moving the latch 84 in the engagement releasing direction (the direction opposite to the direction of arrow B in FIGS. 1 and 2), and press the abutment portions 86 from the lower surfaces thereof. In this way, the latch 84 is moved in the engagement releasing direction.

A holding block 80, which straddles over the inner plates 58, is formed to stand from at the upper plate 28 at a position which is further inward than the outer plates 54 of the button 50. The holding block 80 has a pair of parallel holding plates 82. The latch 84 is disposed between the holding plates 82. The holding plates 82 prevent movement of the latch 84 in the longitudinal direction of the anchor plate 26 (in the direction of arrow A in FIGS. 1 and 2 and the direction opposite thereto), and allow the latch 84 to move in the engaging direction and the engagement releasing direction (the direction of arrow B in FIGS. 1 and 2 and the direction opposite thereto).

The latch 84 is formed in a substantial U-shape as seen from the front. The abutment portions 86 project toward the transverse direction outer sides from the upper surface of the latch 84. An engagement portion 90 projects toward the tongue plate 36 from the transverse direction center of the latch 84. When the tongue plate 36 is inserted in the insertion portion 34 to a predetermined position, the engagement portion 90 passes through a through hole 92 formed in the upper plate 28 of the anchor plate 26, and engages with the engagement hole 88 of the anchor plate 26, and passes through a through hole 94 (see FIG. 1) formed in the lower plate 30.

A pair of plate spring portions 96 are formed to project from the holding block 80 toward the operation portion 52 of the button 50. The plate spring portions 96 urge the button 50 in the direction opposite to the direction of arrow A in FIGS. 1 and 2. In this way, an appropriate resistance is generated at the time when the operation button 52 is pushed.

A middle plate 76, in which an opening is appropriately formed, is provided between the outer plates 52 of the button 50. A leg portion 68 is formed so as to project downwardly from the middle plate 76. The leg portion 68 passes through an elongated hole 70 formed in the upper plate 28, and is positioned between the upper plate 28 and the lower plate 30. The longitudinal direction of the elongated hole 70 runs along the sliding direction of the button 50. Due to the button 50 being slid, the leg portion 68 moves along the elongated hole 70. Further, due to the leg portion 68 being moved along the elongated hole 70, the button 50 is slid. The leg portion 68 which has passed through the elongated hole 70 is positioned on the locus of movement of the tongue plate 36 which moves between the upper plate 28 and the lower plate 30. When the tongue plate 36 reaches a predetermined position between the upper plate 28 and the lower plate 30, the tongue plate 36 abuts the leg portion 68. In this state, when the tongue plate 36 is further slid, the leg portion 68 is pressed by the tongue plate 36 and moves.

A magnetic plate 72, which serves as a magnetic body and is formed of iron or the like, is adhered and fixed to the end surface of the leg portion 68 at the side opposite the side facing the tongue plate 36 which is positioned between the upper plate 28 and the lower plate 30.

One end of a plate-spring-shaped lock spring 98 is mounted to the button 50. The other end of the lock spring 98 abuts the upper surface of the latch 84 and urges the latch 84 in the engaging direction (the direction of arrow B in FIGS. 1 and 2).

The present buckle device 10 is provided with a sensing portion 112 which forms a lock detecting device 110. The sensing portion 112 has a magnet 116. The magnet 116 is disposed at the side of the leg portion 68 which is opposite the side at which the tongue plate 36, positioned between the upper plate 28 and the lower plate 30, is located. The magnet 116 has polarity along the direction in which the tongue plate 36 slides between the upper plate 28 and the lower plate 30. (Specifically, the N pole of the magnet 116 is positioned at the leg portion 68 side, and the S pole is positioned at the opposite side.) An MRE sensor (magnetoresistance sensor) 118 is disposed adjacent to the magnet 116 at the leg portion 68 side of the magnet 116. The MRE sensor 118 may be formed by a so-called "strong magnetic body magnetoresistance element" which is formed by a strong magnetic body of a nickel-cobalt (Ni-Co) alloy whose main components are nickel and cobalt, or the like. Or, the MRE sensor 118 may be formed by a so-called "semiconductor magnetoresistance element" formed from indium antimonide, or the like. The MRE sensor 118 is a type of variable resistance element which varies the electrical resistance value in accordance with the orientation of the magnetic field crossing the MRE sensor 118.

The electrical circuit including the sensing portion 112 is electrically connected to a control device (not shown) such as a computer or the like. This electrical circuit is electrically connected, via the control device, to a lamp (not shown) provided at the instrument panel or the like of the vehicle. The control device fetches the electric potential difference which varies in accordance with changes in the electrical resistance value of the MRE sensor 118 detected by a detector provided at the aforementioned electrical circuit. If the fetched electric potential difference is the same as or is within a range which is judged to be the same as a predetermined electric potential difference stored in advance in the control device, the lamp is lit.

Next, operation and effects of the present embodiment will be described. In a state in which the tongue plate 36 is not inserted in the insertion portion 34, the projections 64 of the button 50 abut the abutment portions 86 of the latch 84 from the lower sides thereof. Movement of the latch 84 in the engaging direction (in the direction of arrow B in FIGS. 1 and 2) due to the urging force of the lock spring 98 is prevented.

When the tongue plate 36 is inserted in the insertion portion 34, the tongue plate 36 engages with the ejector 38 and presses the ejector 38, such that the ejector 38 is slid against the urging force of the eject spring 40. Further, when the ejector 38 is slid to a predetermined position, the ejector 38 abuts the leg portion 68 of the button 50, and pushes the leg portion 68 such that the button 50 is moved. Due to movement of the button 50, the projections 64 of the button 50 move away from the abutment portions 86 of the latch 84. Thus, the latch 84 receives the urging force of the lock spring 98, and becomes able to move in the engaging direction (in the direction of arrow B in FIGS. 1 and 2). The engagement portion 90 of the latch 84 thereby passes through the through hole 92 of the upper plate 28, and enters into the engagement hole 88 of the tongue plate 36. Next, the button 50 is pushed by the plate spring portions 96 so as to move in the direction opposite to the direction of arrow A in FIGS. 1 and 2. Then, the projections 64 of the button 50 abut the abutment portions 86 of the latch 84 from the upper sides thereof, such that movement of the latch 84 in the engagement releasing direction (the direction opposite to the direction of arrow B in FIGS. 1 and 2) is prevented (the locked state).

Figure 3:
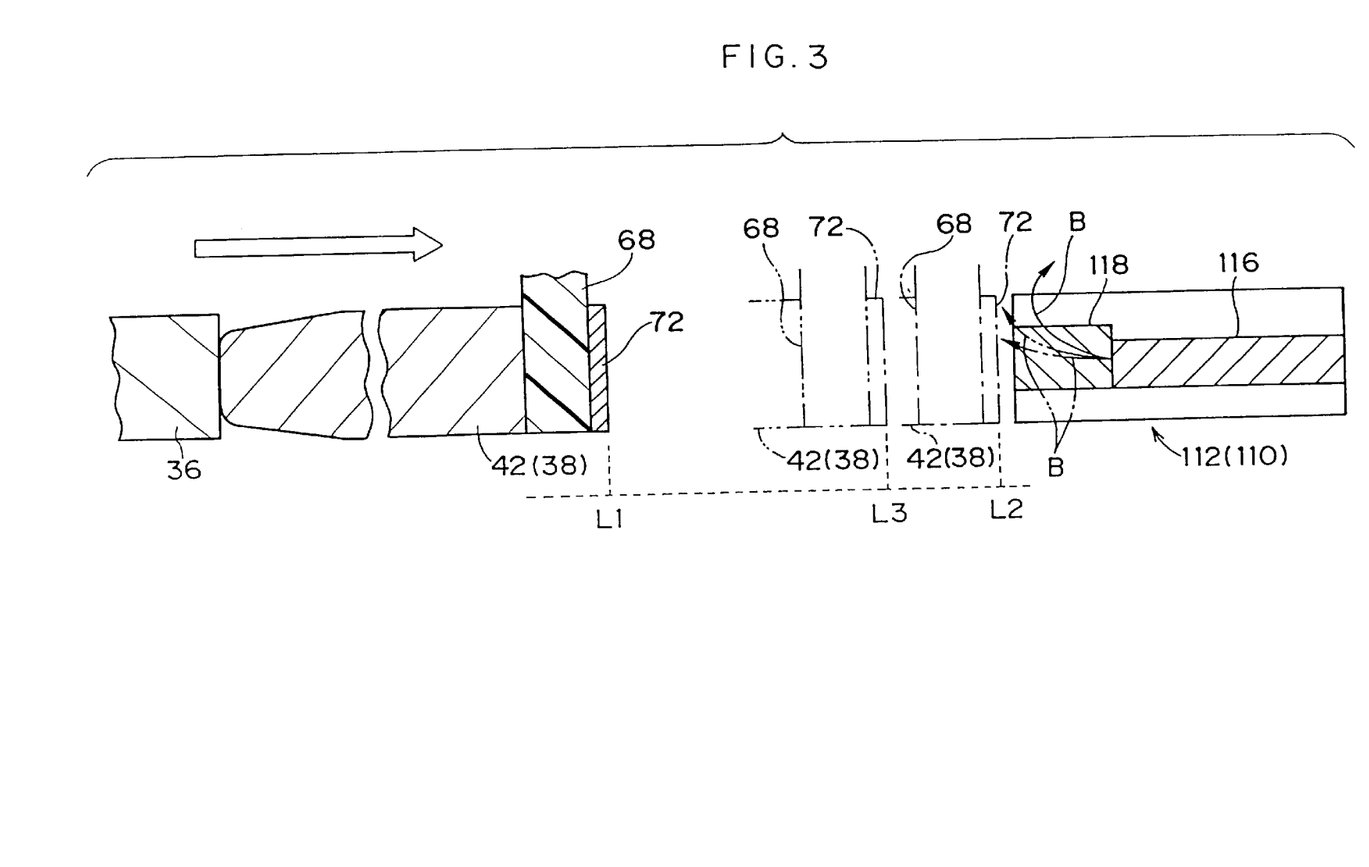
FIG. 3 is a drawing which schematically illustrates the positional relationships between a magnetoresistance sensor, a magnet and a magnetic body.

Here, the initial position of the leg portion 68, i.e., the position of the leg portion 68 at the time when the ejector 38, which is slid by the pushing force from the tongue plate 36, abuts the leg portion 68 and attempts to push the leg portion 68, is denoted by L1 as illustrated in FIG. 3. A magnetic field B of the magnet 116 in this state is affected by the magnetic plate 72 provided at the leg portion 68 and by other magnetic members. However, basically, the relative positional relationships between these magnetic members and the magnet 116 do not change. As a result, the magnetic field B of the magnet 116 at this time is basically a static magnetic field B. The orientation of a portion of the magnetic field B is the direction denoted by the solid line arrow in FIG. 3. At this time as well, the magnetic field B of the magnet 116 crosses the MRE sensor 118. Thus, due to the component, of the magnetic field B which crosses the MRE sensor 118, which component is in the direction orthogonal to the orientation of the current flowing through the MRE sensor 118, the electrical resistance value of the MRE sensor 118 changes to a value which is different from the original electrical resistance value. Namely, the electrical resistance value of the MRE sensor 118 at this time is the initial electrical resistance value of the MRE sensor 118 in the present buckle device 10. This value is called V1 (see FIG. 4).

By the ejector 38 abutting against the leg portion 68 and the tongue plate 36 pressing the leg portion 68, the leg portion 68 moves to a position L2 at which the projections 64 move apart from the abutment portions 86 of the latch 84. (Namely, the leg portion 68 moves to the position illustrated by the one-dot chain line in FIG. 3.) When the leg portion 68 moves to this position, the distance between the leg portion 68 and the magnet 116 is sufficiently smaller than when the leg portion 68 is positioned at previous position L1. Thus, the magnetic field B of the magnet 116 is drawn by the magnetic plate 72 provided at the leg portion 68. As illustrated by the one-dot chain line arrow in FIG. 3, the orientation of the magnetic field B is bent toward the leg portion 68.

Figure 4:
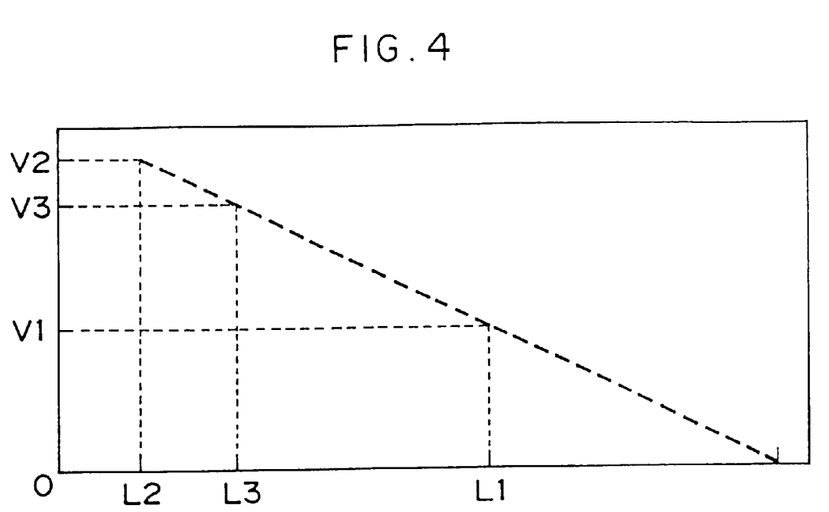
FIG. 4 is a graph showing electric potential differences at respective positions of the magnetic body.

When the orientation of the magnetic field B of the magnet 116 changes, the component of the magnetic field B of the magnet 116 crossing the MRE sensor 118, which component is in the direction orthogonal to the orientation of the current flowing through the MRE sensor 118, changes. As a result, the electrical resistance value of the MRE sensor 118 varies. As illustrated in FIG. 4, the electric potential difference detected at the detector increases to become V2. As a result, first, the control device detects that the tongue plate 36 has been inserted to the position at which the latch 84 can enter into the engagement hole 88 of the tongue plate 36.

Next, from this state, when the latch 84 enters into the engagement hole 88 of the tongue plate 36, the button 50 is pressed by the spring plate portions 96 and is moved in the direction opposite to the direction in which the tongue plate 36 is inserted, such that the tongue plate 36 is locked. At this time, the leg portion 68 also moves in the direction opposite to the direction of insertion of the tongue plate 36, and reaches the position L3 shown in FIG. 3 (the position shown by the two-dot chain line in FIG. 3). When the leg portion 68 is positioned at L3, the leg portion 68 is spaced apart from the magnet 116 slightly more than when the leg portion 68 is positioned at L2. Thus, as illustrated by the two-dot chain line arrow in FIG. 3, the effect that the magnetic plate 72 has on the magnetic field B of the magnet 116 slightly lessens. As a result, as illustrated in FIG. 4, when the leg portion 68 is positioned at L3, the electric potential difference detected by the detector is V3, which is less than V2. Due to the detector detecting this electric potential difference V3, the control device detects that the locked state has arisen, and the control device lights the lamp. In this way, the vehicle occupant can confirm whether or not the tongue plate 36 is locked.

Even if some problem were to arise such that the latch 84 were to fall down even though the tongue plate 36 were not inserted, there would be no changes whatsoever in the leg portion 68 itself. Thus, there would be no changes in the electric potential difference detected by the detector. As a result, in such a case, the detector would not detect the electric potential difference V3, and the control device would not light the lamp.

A method using a Hall sensor which applies the so-called "Hall effect" is a method of detecting whether or not the tongue plate 36 is in a locked state from the movement of the leg portion 68 at which the magnetic plate 72 is provided. However, the Hall sensor, which is the main body portion of the Hall sensor, is an element which measures the intensity of the magnetic field B. When the Hall sensor detects a magnetic field B of a predetermined magnitude, it is detected that the tongue plate 36 is locked or that the tongue plate 36 is not yet locked. As a result, when the magnetic field B of the magnet 116 weakens due to the passage of time or the like, regardless of the fact that the tongue plate 36 is not locked, the sensor detects a magnetic field B which is equivalent to that of a locked state, or conversely, regardless of the fact that the tongue plate 36 is locked, the sensor detects a magnetic field B which is equivalent to that of an unlocked state.

In contrast, the MRE sensor 118 used in the present buckle device 10 does not detect the intensity of the magnetic field B, and detects changes in the electric potential difference which accompany changes in the orientation of the magnetic field B. Thus, problems such as those described above do not arise. Accordingly, reliability of detection can be maintained over a relatively long period of time, and maintenance such as replacement of the magnet 116 or the like is unnecessary.

Further, in general, the Hall sensor is greatly affected by changes in the ambient temperature. This is compensated for usually by including in the circuit a thermistor of a different temperature coefficient. However, with the MRE sensor 118, there is no need for such compensation, and the cost is therefore low.

Next, other embodiments of the present invention will be described. Portions and parts which are fundamentally the same as those of the first embodiment or those of preceding embodiments are denoted by the same reference numerals, and description of such portions and parts is omitted.

Second Embodiment

Figure 5:
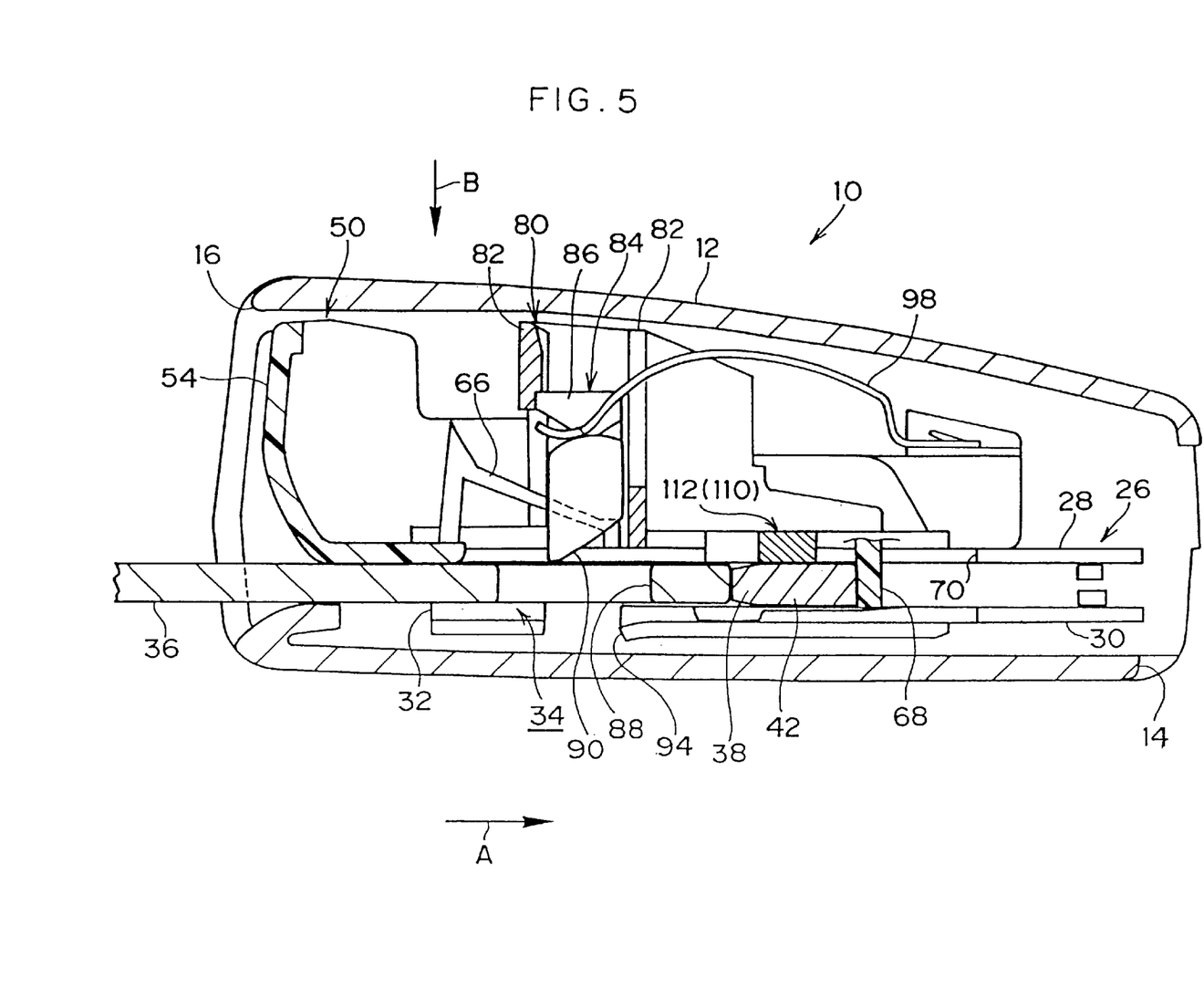
FIG. 5 is a cross-sectional view illustrating the structure of a buckle device relating to a second embodiment of the present invention.

The structure of a buckle device 150 relating to a second embodiment of the present invention is illustrated in cross-section in FIG. 5. As is shown in FIG. 5, comparing the present buckle device 150 with the buckle device 10 of the first embodiment, the mounting position of the sensing portion 112 of the lock detecting device 110 is different in the present buckle device 150.

Namely, in the present buckle device 150, the sensing portion 112 of the lock detecting device 110 is in extremely close proximity to the tongue plate 36 which is in the locked state. The sensing portion 112 is provided, with respect to the tongue plate 36, at the tongue plate 36 insertion direction side and at the side at which the latch 84 is located prior to engagement (i.e., the sensing portion 112 is provided at a position higher than the tongue plate 36). Further, in the above-described first embodiment, the materials of the tongue plate 36 and the latch 84 are not particularly specified. However, in the present buckle device 150, the tongue plate 36 and the latch 84 are formed by magnetic bodies formed of metal or the like. Namely, in the above-described first embodiment, the magnetic plate 72 serving as the magnetic body is provided separately from the tongue plate 36 and the latch 84. However, in the present second embodiment, the tongue plate 36 and the latch 84 serve also as the "magnetic body" of claim 1.

Operation and the effects of the present second embodiment will be described hereinafter with reference to FIGS. 6A through 6E and FIG. 7.

As described above, the tongue plate 36 and the latch 84 are formed by magnetic bodies of metal or the like. Further, the sensing portion 112 is disposed at a position which is extremely close to the tongue plate 36 which is in the locked state. Thus, the magnetic field B of the magnet 116 is affected by the tongue plate 36 and the latch 84.

Figure 6A:
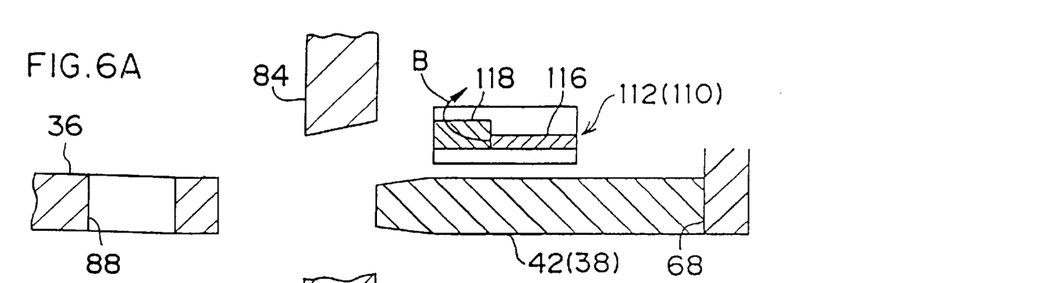
FIGS. 6A through 6E are drawings which schematically illustrate the positional relationships between a magnetoresistance sensor, a magnet, a tongue plate, and a latch.
Figure 7:
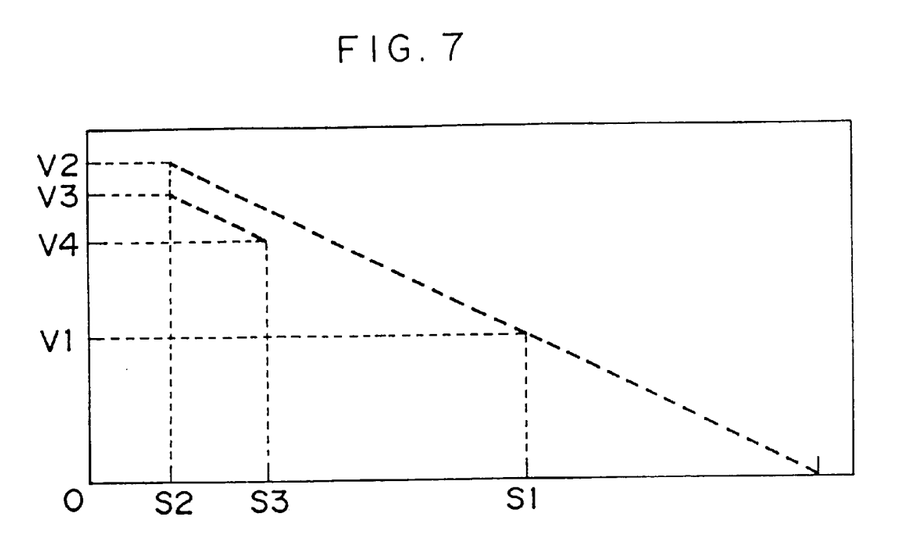
FIG. 7 is a graph showing electric potential differences at respective positions of a magnetic body.

First, as illustrated in FIG. 6A and FIG. 7, in the state before the tongue plate 36 is inserted into the insertion portion 34 or in the state in which the tongue plate 36 is far enough away from the magnet 116 even though the tongue plate 36 is inserted in the insertion portion 34, the tongue plate 36 does not affect the magnetic field B of the magnet 116. Further, although there is the possibility that the latch 84 will affect the magnetic field B of the magnet 116, because the latch 84 is stopped at a predetermined position, the magnetic field B does not change. In this state, the electric potential difference detected by the detector is 0.

Figure 6B:
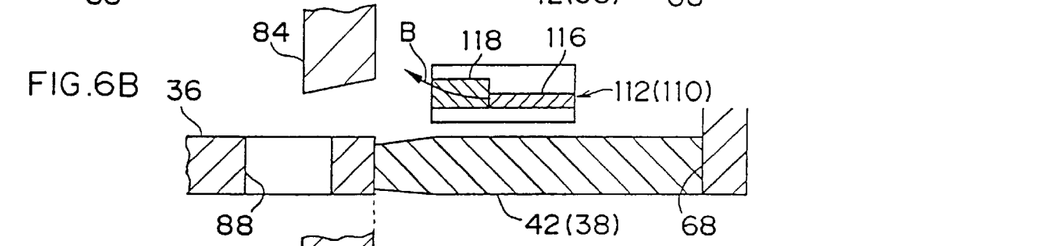

Next, as illustrated in FIG. 6B, when the tongue plate 36 inserted in the insertion portion 34 reaches a predetermined position S1 at which the magnetic field B of the magnet 116 may be affected (i.e., the magnetic field of the magnet 116 may be drawn), the magnetic field B of the magnet 116 changes. The electrical resistance value of the MRE sensor 118 changes, and the electric potential difference V1 is detected at the detector as illustrated in FIG. 7.

Figure 6C:
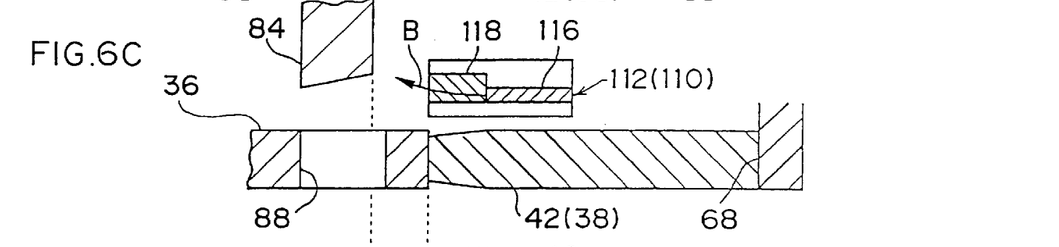

From this state, when the tongue plate 36 reaches position S2 at which the latch 84 can engage with the engagement hole 88 of the tongue plate 36 as illustrated in FIG. 6C, the magnetic field B of the magnet 116 again varies. As illustrated in FIG. 7, the electric potential difference V2 is detected at the detector, and it is detected that the tongue plate 36 has reached S2.

When the tongue plate 36 which has reached S2 pushes, in the same way as in the first embodiment, the leg portion 68 via the ejector 38 such that the leg portion 68 moves, the projections 64 of the button 50 move apart from the abutment portions 86 of the latch 84. The urging force of the lock spring 98 is applied to the latch 84 such that the latch 84 moves in the engaging direction (the direction of arrow B). The engagement portion 90 of the latch 84 passes through the through hole 92 of the upper plate 28 and engages with the engagement hole 88 of the tongue plate 36.

Figure 6D:
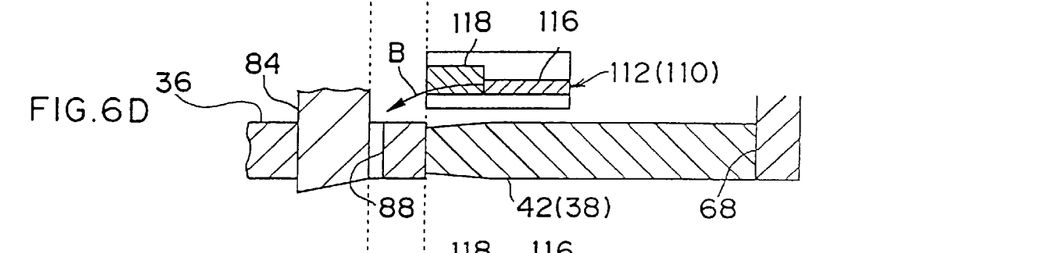

At this time, the latch 84, which is a magnetic body, affects the magnetic field B of the magnet 116. Namely, as illustrated in FIG. 6D, at the sensing portion 112, which is at a position higher than the tongue plate 36 in the same way as the latch 84 in the state before engagement with the engagement hole 88, the magnetic field B is drawn downward by the latch 84 due to the latch 84 moving downward and a portion thereof or the entire latch 84 being positioned at a position lower than the sensing portion 112. Accordingly, in this case as well, the orientation of the magnetic field B of the magnet 116 which crosses the MRE sensor 118 changes, and the component of the magnetic field B in the direction orthogonal to the orientation the electric current flowing through the MRE sensor 118 changes. In this way, regardless of the fact that the tongue plate 36 is at the position S2, the electrical resistance value of the MRE sensor 118 changes, and accordingly, the electric potential difference detected by the detector changes to V3 as illustrated in FIG. 7. It can thereby be detected that the latch 84 has moved downward.

Figure 6E:
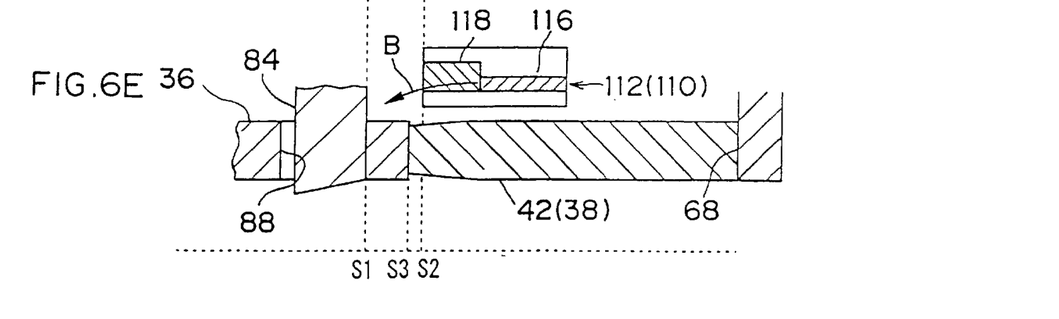

Next, in the same way as in the above-described first embodiment, from this state, when the latch 84 enters into the engagement hole 88 of the tongue plate 36, the button 50 is pushed by the spring plate portions 96 and moves in the direction opposite to the direction in which the tongue plate 36 is inserted, resulting in the locked state. At this time, as illustrated in FIG. 6E, the tongue plate 36 moves in the direction opposite to the direction of insertion thereof and reaches the position S3, and the distance between the tongue plate 36 and the magnet 116 increases slightly. As a result, the affect of the tongue plate 36 on the magnetic field B of the magnet 116 decreases slightly, and as shown in FIG. 7, the electric potential difference detected by the detector decreases to V4. It can thereby be detected that the tongue plate 36 is locked.

Here, even if, due to some problem, the latch 84 were to not move downward although the tongue plate 36 were inserted in the insertion portion 34, even if the tongue plate 36 were at the position S3, the magnetic field B of the magnet 116 would not be affected at the time the latch 84 moved downward. As a result, the electric potential difference detected by the detector would be greater than V4. Thus, the control device would not recognize a locked state. Further, in a case in which the latch 84 moves downward regardless of the fact that the tongue plate 36 is not inserted, the magnetic field B of the magnet 116 would be affected by the latch 84 moving downward, but would not be affected by the tongue plate 36 being inserted. Thus, the variation in the magnetic field B would be slight, and the electric potential difference detected by the detector would not reach V4. Accordingly, in this case as well, the control device would not recognize a locked state.

In this way, in the present buckle device 150, the control device does not recognize that the tongue plate 36 is in a locked state unless the latch 84 has moved downward and the tongue plate 36 has reached the position S3. Thus, more reliable detection of the locked state is made possible.

Further, the control device causes lighting of a lamp or emitting of a sound such as a buzzer or the like in cases in which the detector detects the electric potential difference when the latch 84 has not moved downward although the tongue plate 36 is positioned at the position S3, or in cases in which the detector detects the electric potential difference when the latch 84 moves downward regardless of the fact that the tongue plate 36 is not inserted. Thus, the buckle device 150 can be notified that a problem such as those described above has occurred.

Figure 8:
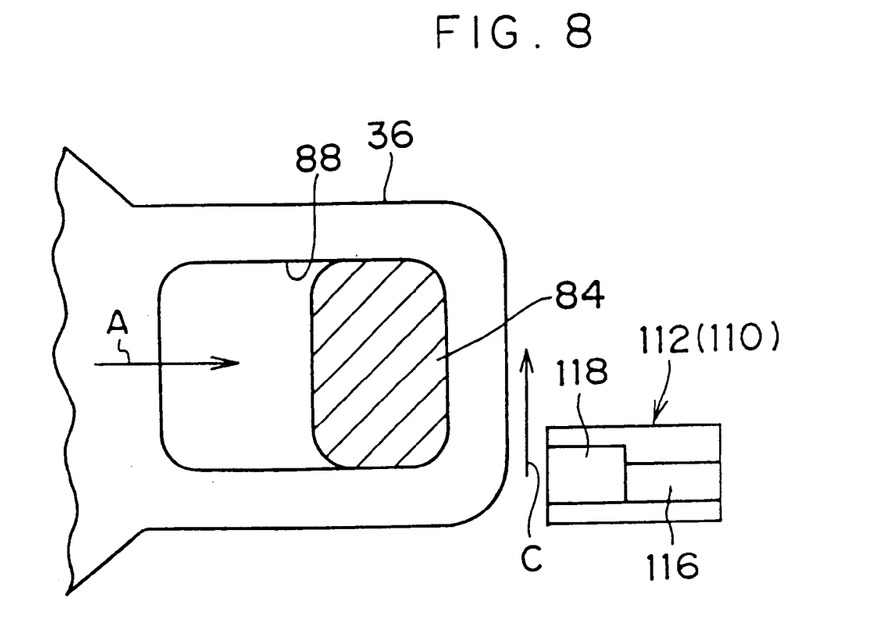
FIG. 8 is a drawing which schematically illustrates a modified example in which the positional relationship of the magnet and the magnetoresistance sensor is changed.

In the above-described first embodiment and in the present second embodiment, the MRE sensor 118 detects the change in the orientation of the electric field B (more specifically, the change in the orientation of the magnetic lines of force forming the magnetic field B) to the direction along the moving direction of the latch 84 with respect to the tongue plate 36 insertion direction. However, for example, as illustrated simply in FIG. 8, the MRE sensor 118 may detect the change in the orientation of the magnetic field B (more specifically, the change in the orientation of the magnetic lines of force forming the magnetic field B) to the direction orthogonal to both the latch 84 moving direction and the tongue plate 36 insertion direction with respect to the tongue plate 36 insertion direction (i.e., the change in the orientation of the magnetic field B to the direction of arrow C in FIG. 8, which is the transverse direction of the case 12 shown in FIG. 2).

Third Embodiment

Figure 9:
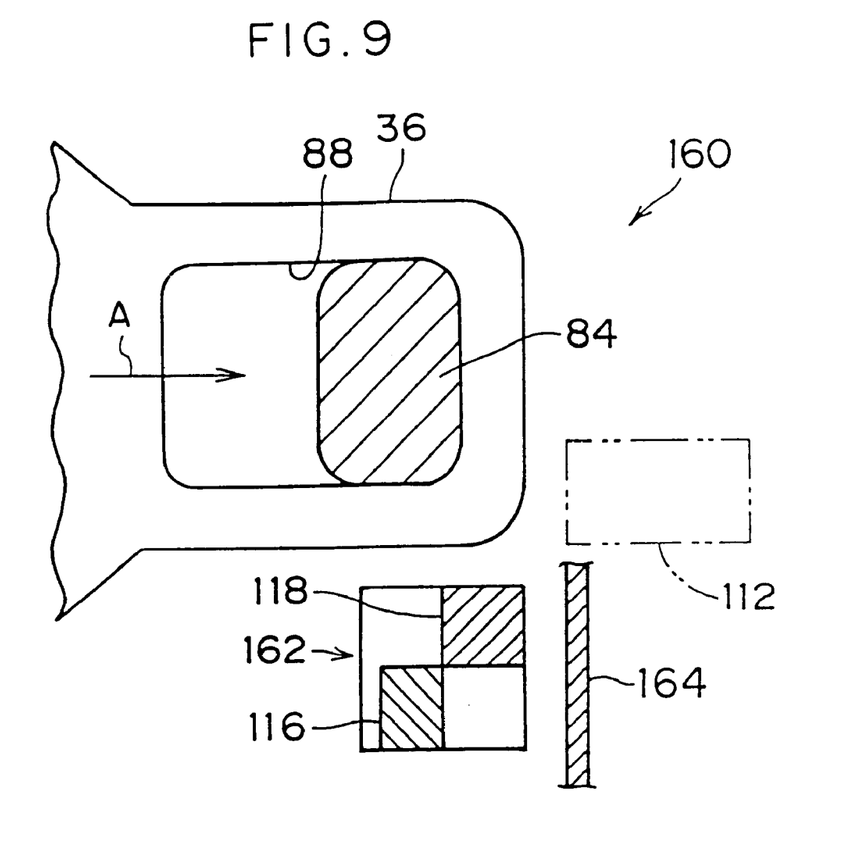
FIG. 9 is a schematic plan view illustrating the structure of a buckle device relating to a third embodiment of the present invention.

Next, a third embodiment of the present invention will be described. FIG. 9 illustrates, in plan view, the schematic structure of a buckle device 160 relating to a third embodiment of the present invention. In this plan view, the sensing portion 112 illustrated by the two-dot chain line is at the position of the sensing portion 112 in the buckle device 150 of the previously-described second embodiment. A sensing portion 162 illustrated by solid lines is at its position in the present buckle device 160. As illustrated in FIG. 9, in the buckle device 150 of the second embodiment, the sensing portion 112 is positioned at the side at which the latch 84 is disposed in the state before engagement with the tongue plate 36. However, in plan view, the sensing portion 112 is positioned on an extension of the locus of insertion movement of the tongue plate 36. In contrast, the sensing portion 162 of the present buckle device 160 is provided at a transverse direction side of the tongue plate 36 in the locked state.

Further, although the sensing portion 162 is provided with the MRE sensor 118 and the magnet 116 in the same way as the sensing portion 112, the arrangement thereof is different than in the sensing portion 112. Namely, in the sensing portion 162, the MRE sensor 118 is disposed further toward the tongue plate 36 locus of movement side and the tongue plate 36 moving direction side than the magnet 116.

Moreover, the present buckle device 160 is provided with a shield plate 164 formed from a magnetic material such as metal or the like. The shield plate 164 is provided at the side of the magnet 116 opposite the side at which the MRE sensor 118 is provided.

In the buckle device 160 having the above-described structure, the position at which the sensing portion 162 is disposed is different than the position at which the sensing portion 112 is disposed in the buckle device 150 relating to the second embodiment. However, both are similar with regard to the point that the orientation of the magnetic field of the magnet 116 crossing the MRE sensor 118 is changed by movement of the tongue plate 36 or the latch 84. Accordingly, the present buckle device 160 has operation and effects which are basically similar to those of the buckle device 150 of the second embodiment.

Further, in the present buckle device 160, even if a magnetic field is generated by a member other than the magnet 116 at the side of the shield plate 164 opposite to the side at which the magnet 116 is provided, the MRE sensor 118 is not affected by the magnetic field of this other member, and reliability of detection is improved even more.

As described above, in the present invention, whether a tongue plate is locked or not can be reliably detected by variations in the resistance value of a magnetoresistance element, and even if the coercive force of the magnet deteriorates due to the passage of time or the like, accuracy of detection can be ensured.

What is claimed is:

1. A buckle device comprising:

a tongue plate;

a buckle main body;

a movable latch interlocking with the tongue plate which is inserted into the buckle main body;

an interlock element, including a movable magnetic plate, which moves along with the tongue plate when the tongue plate is inserted; and a sensor operable for detecting movement of the magnetic plate, wherein the sensor includes a magneto resistance element utilizing an anisotropic magneto resistance effect, and a bias magnet, the magneto resistance element being disposed between the bias magnet and the movable magnetic plate such that the bias magnet projects magnetic flux lines through said magneto resistance element in a first orientation when said magnetic plate is moved away from said magneto resistance element and in a second, substantially different orientation when said magnetic plate is moved toward said magneto resistance element, and said sensor operates by detecting changes in an electrical potential of said magneto resistance element caused by changes in the magnetic flux lines from said first orientation to said second orientation.

2. The buckle device according to claim 1, wherein the sensor outputs a signal corresponding to changes in resistance of the magnetoresistance element.

3. The buckle device according to claim 1, wherein the tongue plate is polarized, and the sensor detects movement of the tongue plate.

4. The buckle device according to claim 1, wherein the latch is polarized, and the sensor detects movement of the latch.

5. The buckle device according to claim 1, wherein the tongue plate and the latch are both polarized, and the sensor separately detects movement of the tongue plate and movement of the latch.

6. The buckle device according to claim 1, wherein the tongue plate has through hole into which the latch enters from the interlocking.

7. The buckle device according to claim 1, further comprising a shield plate for preventing malfunctioning of the sensor provided in a vicinity of the sensor.

8. The buckle device defined in claim 1, wherein said bias magnet is adjacent to a first side of said magneto resistance element.

9. The buckle device defined in claim 1, wherein said bias magnet is in contact with a first side of said magneto resistance element.

10. The buckle device defined in claim 1, wherein said bias magnet projects curled magnetic field lines through said magneto resistance element, and said magnetic plate straightens said curled field lines when moved toward said element.

11. The buckle device according to claim 1, further comprising a switch operable for releasing interlocking.

12. A The buckle device according to claim 11, wherein the switch moves together with the tongue plate which is inserted.

13. The buckle device according to claim 1, wherein the latch linearly reciprocates for interlocking with the tongue plate.

14. The buckle device according to claim 13, wherein a direction of reciprocal movement of the latch and a direction of insertion of the tongue plate intersect each other.

15. The buckle device according to claim 1, wherein the latch is movable between an interlock position at which the latch engages with the tongue plate and anchors the tongue plate, and a non-interlock position at which the latch does not engage with the tongue plate.

16. The buckle device according to claim 15, wherein when the latch is at the interlock position, the sensor produces a first output, and the when the latch is at the non-interlock position, the sensor produces a second output different than the first output.

17. The buckle device defined in claim 1, wherein one of two pole ends of said bias magnet is adjacent to a first side of said magneto resistance element, and said magnetic body is movable toward and away from a side of said element opposite from said first side.

18. The buckle device defined in claim 17, wherein a height of said pole end of said bias magnet is less than a height of said first side of said element.

* * * * *